Sept. 22, 1959  M. P. BUDNEY ET AL  2,905,027
JIG BORER HAVING AUXILIARY TRANSMISSION
AND IMPROVED ELEVATING MECHANISM
Filed Aug. 20, 1956
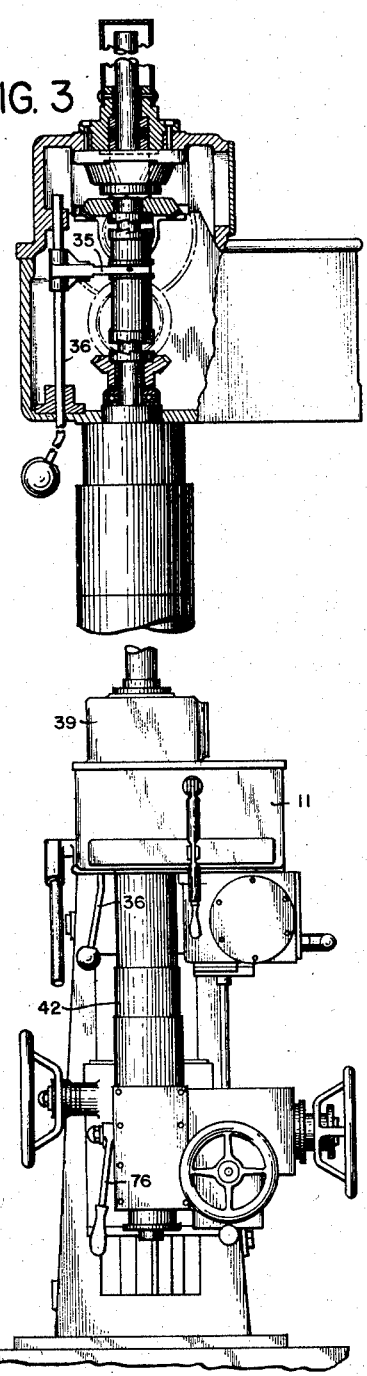
FIG. 3
FIG. 2
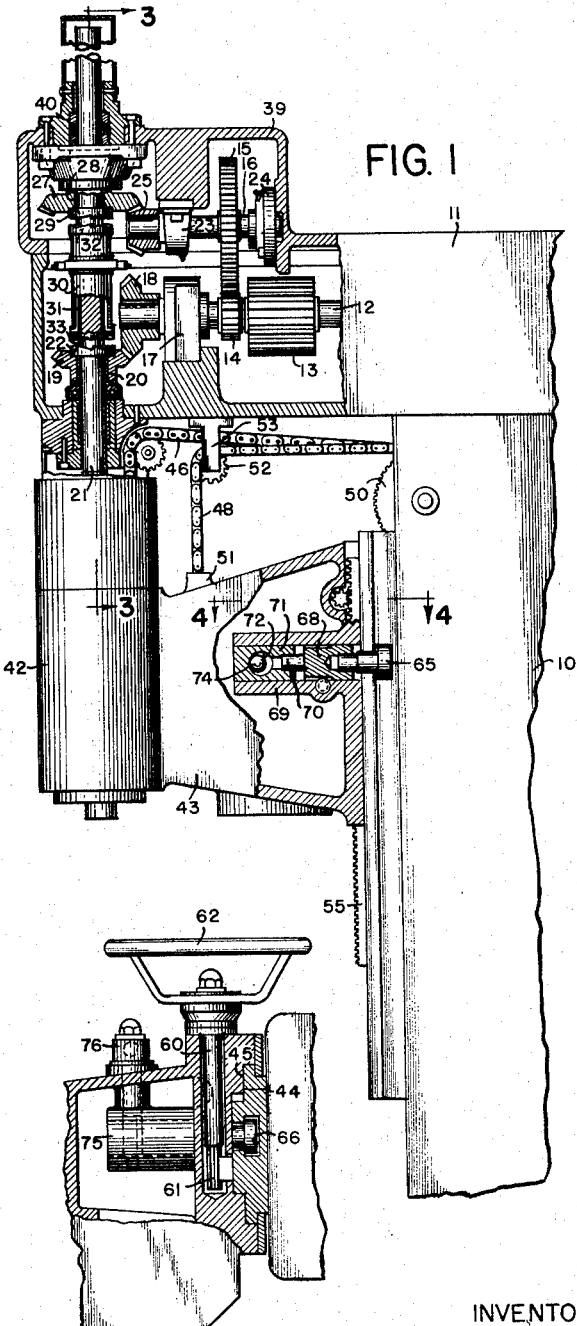
FIG. 1
FIG. 4
INVENTORS
M.P. BUDNEY
H.S. BUDNEY
T. W.BUDNEY
M.J. SACZAWA
BY A. Yates Dowell,
ATTORNEYS United States Patent Office 2,905,027
Patented Sept. 22, 1959

2,905,027

JIG BORER HAVING AUXILIARY TRANSMISSION AND IMPROVED ELEVATING MECHANISM

Michael P. Budney, Berlin, Henry S. Budney and Thaddeus W. Budney, Newington, and Matthew F. Saczawa, Wethersfield, Conn., assignors to Atlantic Machine Tool Works, Inc., Newington, Conn.

Application August 20, 1956, Serial No. 605,016

2 Claims. (Cl. 77—4)

This invention relates to machine tools, more particularly to a jig borer, and is a continuation-in-part of our earlier application Serial No. 578,007 filed April 13, 1956.

In a jig borer of the type described the availability of drive motors capable of operating over the wide range of speeds desirable, is limited. Furthermore, economic and other considerations may make it desirable to use a drive motor which is not designed for operating at as slow a speed as may be necessary.

Accordingly, it is an object of the present invention to provide a jig borer having an auxiliary transmission operable directly from the main drive shaft by means of which a lower range of speed may be obtained for the spindle.

A further object is to provide a relatively simple, easy to construct and install, auxiliary transmission which is easily accessible to the operator for operation, inspection and repair.

A further object is to provide an improved quill and spindle elevating mechanism which is easily to adjust and lock in place or release.

These and other objects of the invention will become apparent from the following description taken in conjunction with the accompanying drawing wherein:

Fig. 1 is a fragmentary side elevation with portions in section of the auxiliary transmission and quill elevating mechanism and lock;

Fig. 2 a fragmentary front elevation of the portion of the jig borer illustrated in Fig. 1;

Fig. 3, a section on the line 3—3 of Fig. 1; and

Fig. 4, a section on the line 4—4 of Fig. 1.

Briefly stated the illustrated embodiment includes an auxiliary transmission mounted over the main drive shaft and having a short auxiliary shaft driven from the drive shaft. The spaced ends of the auxiliary shaft and the drive shaft carry miter gears which are in continuous engagement with a spaced pair of miter gears at right angles, both of the latter being freely rotatable on the upper portion of the spindle.

Intermediate the miter gears mounted on the spindle is a clutch which is keyed to the spindle and is engageable with either clutch plate carried by the miter gears. The clutch may be engaged with the gear driven by the drive shaft for normal operation, with the gear driven by the auxiliary shaft for operation at lower speeds, or be disengaged, no change in the direction of rotation being involved for either drive position.

The improved gear elevating mechanism includes a pinion mounted in the quill housing which engages a rack mounted on the front face of the column, the quill housing and column being locked together by an eccentric operated locking member.

With further reference to the drawing, the jig borer illustrated has a vertical column 10 which is secured at its lower end to a base (not shown). At its upper end a transmission housing 11 is mounted and has a main drive shaft 12 which is driven from a suitable source. The drive shaft has a main drive gear 13 which meshes with other gears in the main transmission and has a spur gear 14 meshed with a spur gear 15 mounted on auxiliary drive shaft 16 of the auxiliary transmission. The main drive shaft 12 is supported by bearing 17 in the housing and has a miter gear 18 at its drive end.

The miter gear 18 is in constant engagement with a miter gear 19 which is mounted by bearing 20 for rotation on spindle 21. Rigidly connected to the upper face of the gear 19 is a clutch plate 22.

Auxiliary drive shaft 16 is mounted in suitable bearings 23 and 24 and has a miter gear 25 at its drive end which is spaced from the miter gear 18 carried by the main drive shaft. The miter gear 25 is in constant mesh with miter gear 27 which is mounted for rotation on spindle 21 by bearing 28. Rigidly attached to the lower face of miter gear 27 is a clutch plate 29.

The miter gears 19 and 27 which are driven by the main and auxiliary drive shafts 12 and 16, respectively, are spaced apart on the spindle. Intermediate the clutch plates 22 and 29 carried by the gears is a sleeve type clutch 30 which is keyed to the spindle 21 by L-shaped keys 31. The clutch has toothed surfaces 32 and 33 at its upper and lower ends, respectively, for mating selectively with the clutch plates 29 and 22 connected to the miter gears 27 and 19, respectively.

Intermediate the ends of the clutch 31 a shifter fork 35 is mounted which is operable by a handle 36 extending downwardly from the front portion of the transmission housing. The auxiliary transmission has a suitable cover 39 within the upper portion of which are mounted bearings 40 for the upper portion of the spindle.

The spindle extends downwardly into quill housing 42 having a rear portion 43 with guide surfaces 44 which interengage with mating guide surfaces 45 mounted on the front of the column 10. The weight of the spindle within the quill is counter-balanced by a relatively light weight within the column connected to chain 46 and the weight of the quill housing 42 is counter-balanced by a heavier weight within the column connected to chain 48. The chains run over an idler sprocket 50, the chain 48 being connected to the quill housing close to the barrel portion by a bracket 51. The chain 48 runs over a second idler sprocket 52 which is carried by bracket 53 from the lower side of the transmission housing. As a result of positioning the chain for supporting the quill outwardly substantially from the front face of the column and thus nearer to the center of gravity of the quill, elevation of the quill is facilitated with less likelihood of binding between the mating portions of the quill housing and column.

The elevating mechanism illustrated includes rack 55 mounted on the front face of the column parallel to the slides. The rack, however, instead of being centrally located on the column is offset to one side, being the side having the additional weight from the quill operating hand wheel and associated mechanism. Accordingly, the rack is more nearly along the center of gravity, which facilitates elevation and eliminates any tendency to bind.

Mounted in the side of the rear portion of the quill housing is a shaft 60 including a pinion 61 at its end which engages the rack 55. By turning the hand wheel 62 connected to the shaft the operator may raise or lower the quill housing.

In order to lock the quill housing in position a locking bolt 65 is provided which has its head mounted within a recess 66 in a slot in the front face of the column and is received in a reciprocable locking member 68 mounted in guide member 69. The member 68 has an extension 70 which is engaged with a block 71 which is reciprocable in the guide member 69. The block 71 has a transverse aperture 72 within which the eccentric end 74 of a shaft 75 is received. The shaft is mounted by suitable means in the side wall of the gear housing and has a handle 76 by means of which it may be turned.

In the use of the auxiliary transmission described the operator may cause the spindle to rotate at conventional speeds by shifting the clutch 30 to the lower position in which the clutch plate 22 engages the lower toothed portion 33 of the clutch. For operation at lower speeds he merely shifts the clutch upwardly so that the clutch plate 29 engages the upper portion 32 of the clutch.

The quill housing elevating mechanism as described may be operated with the lock in released position by turning the hand wheel 62 and upon its reaching the desired elevation may be locked by the handle 76, which need only be turned a fraction of a revolution.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A jig borer for producing rotation of a drill at two different rates of speed without affecting the feed thereof, said borer comprising a spindle slidably and rotatably mounted in the boring machine, a pair of bevel gears freely rotatable on said spindle in spaced facing relation, clutch engageable elements on the facing portions of said bevel gears, a positive clutch member slidably mounted on said spindle and keyed thereto and having clutch elements at each end for movement to one or the other of said clutch engageable elements on said pair of bevel gears for producing rotation of the spindle in the same direction, said clutch engageable elements and clutch elements including ratchet teeth, a main drive shaft having a driving bevel gear in engagement with one of the bevel gears on said spindle, an idler shaft supported in spaced relation to said main drive shaft and having a bevel gear in constant mesh with the other bevel gear on said spindle, a spur gear on said main drive shaft, a second spur gear of larger size on said idler shaft, said spur gears being constantly in engagement, and means to move said clutch member from engagement with the clutch engageable element on one bevel gear on said spindle to engagement with the clutch engageable element of the other bevel gear on said spindle.

2. A jig borer for producing rotation of a drill at two different rates of speed without affecting the feed thereof, said borer comprising a column, a transmission housing fixed to the upper end of said column, a spindle slidably and rotatably mounted in said transmission housing, a quill housing slidably mounted on said column for movement toward and away from said transmission housing, a quill slidably mounted in said quill housing and rotatably supporting said spindle, means to move said quill housing toward and away from said transmission housing, said column being provided with a slot extending substantially parallel to said spindle, a locking member extending through said slot and having a head engagable with the column when the member is retracted, an eccentric means extending into the quill housing and in engagement with said locking member whereby operation of said eccentric means will retain said quill housing in fixed position relative to said column, a pair of bevel gears freely rotatable on said spindle in spaced facing relation and mounted in said transmission housing, clutch engageable elements on the facing portions of the said bevel gears, a positive clutch member slidably mounted on said spindle and keyed thereto and having clutch elements at each end for movement to one or the other of said clutch engageable elements on said pair of bevel gears for producing rotation of the spindle in the same direction, said clutch engageable elements and clutch elements including ratchet teeth, a main drive shaft having a driving bevel gear in engagement with one of the bevel gears on said spindle, an idler shaft supported in spaced relation to said main drive shaft and having a bevel gear in constant mesh with the other bevel gear on said spindle, a spur gear on said main drive shaft, a second spur gear of larger size on said idler shaft, said spur gears being constantly in engagement, and means to move said clutch member from engagement with the clutch engageable element on one bevel gear on said spindle to engagement with the clutch engageable element of the other bevel gear on said spindle.

References Cited in the file of this patent

UNITED STATES PATENTS

| 738,246 | Schauer | Sept. 8, 1903 |
| 803,522 | Barnes | Oct. 31, 1905 |
| 913,417 | Milne | Feb. 23, 1909 |
| 1,035,143 | Bayrer | Aug. 13, 1912 |
| 1,323,267 | Hanson | Dec. 2, 1919 |
| 1,637,759 | Allen | Aug. 2, 1927 |

FOREIGN PATENTS

| 208,412 | Germany | Mar. 26, 1909 |